United States Patent [19]

Anderson

[11] Patent Number: 4,815,261
[45] Date of Patent: Mar. 28, 1989

[54] SEED HARVESTING DEVICE

[76] Inventor: Ray W. Anderson, P.O. Box 1251, Burley, Id. 83318

[21] Appl. No.: 54,791

[22] Filed: May 26, 1987

[51] Int. Cl.⁴ ............................................. A01D 45/00
[52] U.S. Cl. ........................................ 56/126; 56/128; 56/13.1
[58] Field of Search ................. 56/126, 128, 130, 129, 56/16.5, 202, 16.4

[56] References Cited

U.S. PATENT DOCUMENTS

| | | | |
|---|---|---|---|
| 1,587,349 | 6/1926 | Otis et al. | 56/128 |
| 2,853,845 | 9/1958 | Smith | 56/128 |
| 3,017,735 | 1/1962 | Jordan et al. | 56/128 |
| 4,411,125 | 10/1983 | Strickland | 56/320.2 |
| 4,679,386 | 7/1987 | Lundahl et al. | 56/126 |

Primary Examiner—John Weiss
Attorney, Agent, or Firm—Hopkins, French, Crockett Springer & Hoopes

[57] ABSTRACT

An elongate housing is provided for removable attachment to either a self-propelled windrower or conventional farm tractor. A flexible-bristle brush is adjustably secured to the housing such that when the housing is moved through a field of seed-bearing plants, the rotating brush interacts with the housing to strip seeds from the plants. The seeds are deposited in an auger trough and moved by the auger to one end of the housing. An impeller or blower located outside the housing creates a vacuum such that the seeds are drawn through a screened opening in the housing and conveyed to a seed storage area. In order to break apart agglomerations of seeds or seed bearing pods, the blower/impeller is preferably provided in the form of a fan having blades which rotate about a shaft aligned such that the harvested seeds strike the fan blades, thereby breaking apart the seed agglomerates and seed pods. The flexible bristle brush is adjustable so that varying forces may be applied to varying plants having greater or lesser force required to remove seeds therefrom.

20 Claims, 2 Drawing Sheets

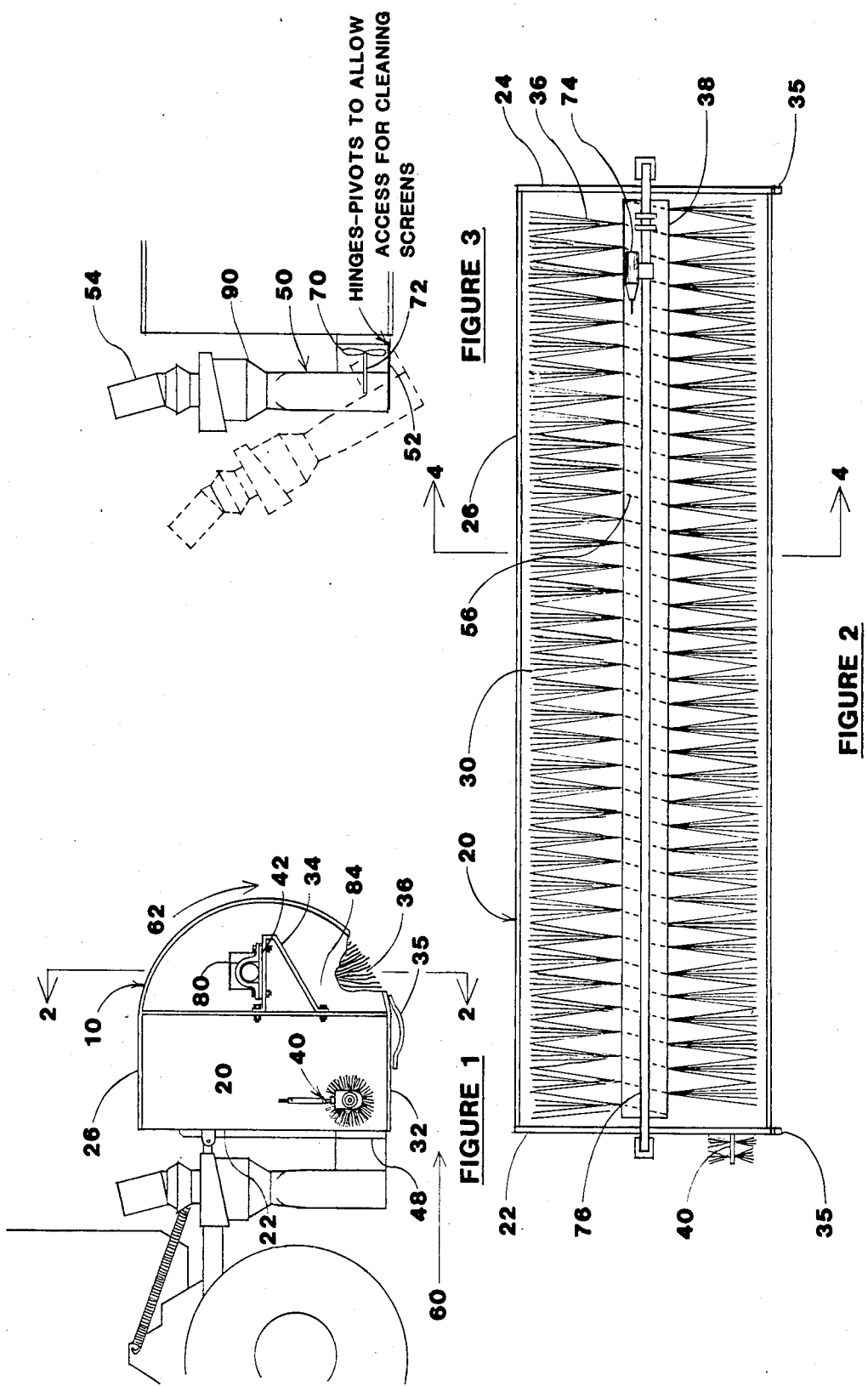

SEED HARVESTING DEVICE

BACKGROUND OF THE INVENTION

As large expanses of semi-arid grasslands west of the Mississippi River were converted into crop producing areas in the 20th Century, native perennial plants, such as grasses, shrubs and flowers, were removed. A large portion of these grasslands have for many years been planted to crop plants, in particular various varieties of winter wheat. As historical fluctuations in the value of farm commodities have made the economies of growing dry land grain crops, as opposed to grazing cattle, somewhat uncertain, many farmers have chosen to take such land out of production and return it to grasslands. The problem encountered in this conversion is that not only the desirable grasses and shrubs naturally reseed these formerly tilled areas. Typically, a large number of undesirable plants exemplified by Russian and Canadian Thistle and Morning Glory, invade the disturbed area and effectively compete with the more desirable native or introduced rangeland plants, such as Crested Wheat Grass, Blue Bunch Grass, Side Oats Grama, Silver Sage Brush, Winterfat, Penstemons, Yarrows, etc.

Various attempts have been made to reseed such areas in the more desirable native grasses and shrubs, but because the areas involved (in many cases thousands of acres) are so great, a ready supply of an adequate seed source has been difficult if not impossible to assure. Methods of harvesting such native seed sources have been relatively inefficient, resulting in extremely high prices for such seeds, thereby making reseeding of such areas financially impracticable. For instance, the prices currently being charged for various common rangeland seeds are: Crested Wheat Grass, $3.50/pound; Great Basin Wild Rye, $7.00/pound; Western Wheat Grass, $5.50/pound. Depending upon the variety, it can take anywhere from 22 to 50 pounds per acre of grass seeds and from 30 to 40 pounds per acre of shrub seeds to adequately replant tilled areas. Such costs are prohibitive over large areas.

Given the agricultural surpluses occurring in the production of corn, wheat and barley in the United States and Canada in the decade of the 1980's, the U.S. Government has instituted a Conservation Reserve Program whereby farmers are paid to remove certain cropland from production and return it to its native state. These are lands which are highly erodable and which were placed in production when profit margins were high enough to make such marginally productive land profitable. The incentives for so doing are sufficient to induce relatively large numbers of farmers to enter the program (approximately 10 million acres in 1986 were accepted).

Therefore, it is an object of the present invention to provide an apparatus which efficiently harvests native seeds from grasses, shrubs and flowers so that they may be used to reseed formerly tilled areas. Such apparatus is more effective than prior seed harvesting apparatus, and therefore can provide such native seeds at a lower cost, thereby increasing the incentive to replant to native vegetation.

Seed harvesting devices for attachment to tractors and/or combines are well known in the art. For example, U.S. Pat. No. 4,373,322, Beisel, discloses a seed harvester which combines a rotating brush member with an elongate hollow housing, wherein when the device is moved through a seed-bearing grass crop, the brush "flails" the seeds from the plant and propels them rearwardly into the housing. Air movement into the device is such that a portion of the debris removed by the brush exits the device through a forward-facing exit. Seeds removed from the plants are deposited in a rearward portion of the housing by centrifugal force. Likewise, U.S. Pat. No. 2,693,072, Belzer et al., discloses a grass seed harvester which is preferably pulled behind a tractor through a grass crop. The device comprises a seed-harvesting brush carried within a housing and an impeller mounted within a duct interconnecting the housing and a seed collector. The impeller and its housing are located at the rearward end of a suction-chamber through which the seeds pass when traveling from the brush to the seed collector. A similar device is disclosed in U.S. Pat. No. 1,297,349, Herr, in which a rotating brush directs seeds into a fan housing. Suction into a drum where the seeds and hulls are separated. The mixed product is then discharged onto a vibrating screen, with the seeds dropping through the screen and the hulls being discharged over the screen.

U.S. Pat. No. 2,345,969, Halley, et al., discloses a seed harvester in which a rotating brush strips seeds from plants and deposits them on an elevator canvas. Deflectors are provided, which apparently remove seeds entrained in the bristles of the brush. Lastly, U.S. Pat. No. 1,587,349, Otis, et al., discloses a seed harvester in which a clam shell-type hood is provided with a rotating brush therein. The hood is constructed such that seed bearing plants are forced within the hood where upon the brush removes the seeds therefrom and deposits them in receptacles within the hood.

Brush fires or range fires in the Western U. S. often burn large expanses of native vegetation. As is the case with former crop land, natural reseeding of burned-over areas many times results in a predominance of unwanted or undesirable plant species. In order to assure such burned over areas are returned to the most desirable condition (i.e., for cattle and wild life grazing), it is advantageous that such areas be mechanically reseeded if sufficient economical supplies of such seeds were available.

Lastly, there is a need for an effective seed harvesting device for harvesting seeds from certain commercial seed crops. For instance, while there are devices currently marketed which will harvest seeds from alfalfa plants, the nature of the seed habit, i.e., a plurality of seeds is arranged in a helically shaped "curl", requires that a multi-step procedure be utilized in order to acquire seeds suitable for planting. Additionally, certain commercially valuable seed sources, such as wild rice, wheat, barley and other grains, flowers and selected seed or vegetable crops could advantageously be harvested by use of the present invention.

BRIEF DESCRIPTION OF THE DRAWINGS

FIG. 1, is a side elevational view of a seed harvesting device of the present invention;

FIG. 2, is a longitudinal sectional view taken substantially upon the plane indicated by the section line 2—2 of FIG. 1;

FIG. 3, is a partial sectional view to show the manner in which the seeds harvested by the present invention are processed.

SUMMARY OF THE INVENTION

Figure 4:
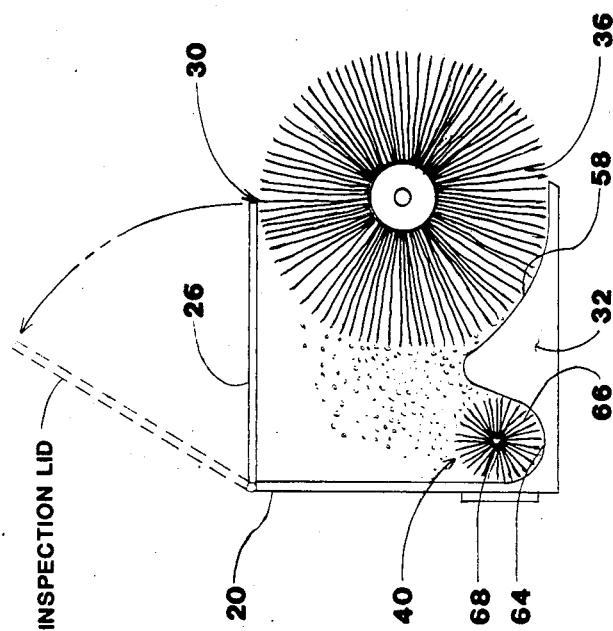
FIG. 4, is a sectional view taken substantially along the plane indicated by the section line 4—4 of FIG. 2.

The present invention comprises a non-destructive seed harvesting apparatus, and a method of using the apparatus, for use in harvesting seeds from either native or agricultural plants. The apparatus comprises a header attachment which is adapted to be removably affixed to a propulsion device, such as a self-propelled windrower or hay swather. An adjustable rotatable flexible brush is disposed within the housing such that plant parts bearing seeds are frictionally engaged between the brush and a lower wall portion of the housing. At least one auger is disposed in an auger trough rearwardly of the brush and directs the seeds harvested thereby to one end of the housing. The seeds are removed from the auger trough by a vacuum created by blower or impeller means located outside the housing. A screen member is disposed between the auger trough and the blower so that seeds are sucked through the screen, but plant debris is retained thereon. After being sucked through the screen member, the seeds impact the impeller, which is advantageously provided in the form of fan blades. In this manner, seed agglomerations or seed pods are broken so that individual seeds may be deposited in a seed storage means. A cyclone cleaner can be provided to remove debris, seed pods, etc., which otherwise would be collected with the seeds.

In a preferred embodiment, the brush is provided with flexible bristles so that minimal damage is done to the vegetative plant parts. Also, the brush is adapted to be adjusted either horizontally or vertically with respect to the housing, and is preferably provided in the form of a rope, having bristles woven therein, wrapped in spiral configuration about a shaft.

DETAILED DESCRIPTION OF THE INVENTION

The present invention is especially adapted to be affixed to the front end of a windrower or hay swather. In the conversion of a typical combine or hay swather, the cutter bar assemblies are removed and the present invention is installed with either a 2-point or 4-point attachment.

While it would appear to be somewhat less desirable, the apparatus of the present invention could likewise be mounted on hydraulically-actuated front end loader arms, commonly found on farm tractors. While it would not be the preferred mode of operation, it is equally clear that the apparatus of the present invention could likewise be mounted on any other propulsion device, such as a pickup truck, boat, continuous-track vehicle, etc.

The present invention can be generically described as a "seed-harvesting header" and is denoted generally in FIG. 1, by the numeral 10. The header is comprised of a housing member 20, a brush 30, auger 40 and conduit means 50. Generally speaking, as the present invention is moved through a seed source in the direction of arrow 60, the brush 30 is rotated in the direction of arrow 62. Seed-bearing plants are stripped of their seeds by brush 30, the seeds being propelled to auger 40 and thence through the conduit means 50 to a seed storage area (not shown), which may take the form of a bag, hopper, etc. The operation of the present invention is to be distinguished from conventional combine harvesting of, for instance, wheat, wherein the entire above-ground portion of the plant is severed by a cutter bar and the rotating paddles direct the plant to a deseeding cylinder. After harvesting the seeds from, for instance a grass, the present invention leaves the bulk of the plant standing, affording vegetation for subsequent grazing by wild or domesticated animals, cover for birds, windbreaks for snow (thereby increasing available water for subsequent years growth) and decreased wind erosion.

More specifically, the housing comprises a pair of end walls 22 and 24, a top wall 26, a back wall 28 and a bottom 32. It is contemplated that the housing will be constructed of a medium gauge steel which can be welded, although any suitable material will suffice, such as sheet metal, fiberglass, wood, etc. The brush 30 is carried on a pair of side brackets 34 which project forwardly from the end walls 22, 24. A pair of skids 35, can be provided at the lowermost portion of each end wall so that as uneven terrain is encountered by the invention, damage to the unit is minimized.

The brush 30 is preferably adjustably mounted to the brackets 34 so that it may be adjusted either horizontally or vertically as viewed in FIG. 1. The brush 30 comprises a plurality of flexible bristle members 36 mounted to an outer shaft 38. Adjustability may be provided by any means available to those skilled in the art. For instance, a plurality of shims 42 provides adjustability vertically, by either adding or removing shims to raise or lower the brush. The shims are provided with a plurality of apertures which permit the journal to be moved horizontally, thereby adjusting the brush horizontally. Alternatively, brush 30 may be carried on an adjustable carriage 80 as shown in FIG. 1. The carriage 80 may be adjustably affixed to bracket 82 which is secured to member wall 22 by bolts 84. In this manner, the brush may be moved vertically by adjusting bolts 84 and bracket 34 upwardly or downwardly, and may be adjusted horizontally by sliding carriage 80 horizontally to a new location on bracket 34 prior to securement.

An auger 40 is provided in a rearward and lowermost portion of housing 20. The auger 40 directs seeds collected throughout the width of housing 20 to one end of the housing for removal to the seed storage area. The seeds exit housing 20 through an opening covered by screen 48 in back wall 28. As shown in FIG. 3, a blower or impeller assembly 52 is positioned in conduit 50 to create a vacuum sufficient to pull seeds from the auger 40 through the screen 48 and thence through the pipe 54 to the seed storage area. A cyclone-type separating cleaner 90 can be provided in conduit 50 to remove debris that passes through screen 48.

It has been found that a preferred method of making the brush 30 is to utilize a "rope" having bristles of appropriate length woven therein, with the "rope" thereafter being wound in a helical fashion (represented by the broken lines 56 of FIG. 2) about shaft 38. In such manner, relatively uniform point density can be obtained throughout the surface of the brush and replacement of the brush is a relatively simple matter. By winding the "flights" of the rope 56 about the shaft 38 in a tighter fashion, the point density of the brush can be increased; similarly, by winding the rope in more spaced-apart flights, the point density of the brush can be decreased. Such feature can be of great significance since the point density will, to some degree, determine the "stiffness" or "flexibility" of the brush. For example, when harvesting a grass species which requires very little force to separate the seed from the stem, a more flexible (lesser point density) brush may be utilized, whereas when removing seeds from a woody shrub, a more dense, stiff brush may be needed to penetrate th exterior of the plant and remove a high percentage of the seeds. While a point density of from about 6 points/square inch to about 20 points/square inch is acceptable (depending upon the length and diameter of the individual bristles) it has been found that a point density of from about 10 points/square inch to about 12 points/square inch is acceptable for harvesting most native grasses, shrubs, flowers and other crop plants.

Within housing 20 is an arcuate lower wall portion 58 as shown in FIG. 4. Primary seed removal is accomplished on this arcuate lower wall as the plant is biased between the bristles 36 and wall 58. As the brush 30 is adjusted by moving it either to a lower or more rearward position, greater frictional engagement between the bristles 36 and wall 58 occurs. As the brush 30 is adjusted either upwardly or forwardly, the frictional engagement therebetween can be either reduced or totally eliminated. This feature permits the operator to select the desired amount of force necessary to remove the particular seeds being harvested without causing undue damage either to the seeds or the remaining vegetative material, or to the brush 30.

As seeds are removed from the plants, they are propelled rearwardly and fall into an auger trough 64. The auger 40 can be constructed in any conventional manner. For instance, it can be a conventional screw-type auger, or applicant has found that an auger constructed similar to that of the brush 30 can be advantageously employed. In tee latter instance, a rope of bristles 66 can be relatively loosely wound about an auger shaft 68 to provide conventional canted auger flights. Depending upon the volume of seeds to be harvested, the housing can be provided with a plurality of augers arranged either one above the other or side-by-side. Such arrangement might be necessary when harvesting a large quantity of seeds in a short period of time. As shown in dashed lines in FIG. 4, a portion of the top wall 26 can be hinged to provide a maintenance or observation port.

Applicant has found that it is advantageous to extend the home end of the auger slightly outside housing 20, as shown in FIG. 2. During seed removal, there will inevitably be plant debris (leaves, seed pods, stems, etc.) entrained with the seeds, which is advantageously removed prior to final collection of seeds. Applicant has found that when the seeds are removed through the screen 48 a substantial portion of the plant debris will be retained upon the screen. By positioning the auger 40 such that it sweeps across the screen 48, the screen is continually cleaned and the debris is carried outside housing 20 by auger 40 and deposited in the field. Preferably, the screen is easily removable for cleaning (if it becomes clogged with debris) or for changing for a screen having a different aperture size if different size seeds are harvested.

Many seeds (especially grass seeds) naturally occur in agglomerations of two or more, being fused together either external of or within a seed pod or head. Additionally, many seeds naturally occur singly within seed pods. Such seeds are not suitable for planting, since individual seeds must be provided to a seed drill. Conventionally, seeds are harvested in whatever form they occur and thereafter the seed merchant attempts to break apart the agglomerations or pods to provide individual seeds. An important feature of the present invention is that the device combines these heretofore separate steps and provides a method of separating agglomerated seeds and breaking seed pods. The blower/impeller 52 is provided in the form of a conventional fan having a plurality of blades which substantially span the inside diameter of conduit 50. When operated at high speed in order to create the vacuum necessary to draw seeds through screen 48, virtually all of the seeds passing through screen 48 will contact one or more of the rotating fan blades 70. It is important to note that the seeds being sucked from the auger trough through screen 48 are travelling directly into the fan blades: e.g., they travel in a direction parallel to the axis of shaft 72 about which blades 70 rotate. Such arrangement insures that the seeds will contact the fan blades and separate agglomerations or break open seed pods. This material then preferentially enters a cyclone-type separating cleaner, where seed hulls, seed pods, small debris, etc., are separated, leaving a relatively pure seed stream.

While the moveable parts disclosed herein can be actuated by any conventional power source, applicant has found that hydraulic motors are the preferred power source. For instance, a hydraulic motor 74 can be mounted on shaft 76 within shaft 30 to drive the brush 30. Similarly, hydraulic motors can be used to drive auger 40 and blower 52.

EXAMPLE

Five prototype headers substantially as described above were manufactured and affixed to Heston model 6555 swather tractor. The headers had approximate dimensions of heighth 43½"×depth 48½"×width 14'5", with the seed harvesting brush being constructed of a bristle rope wound about a 10" shaft such that the point density was about 10 points/inch square. The auger was likewise constructed of bristle rope wound about a 2" shaft. The diameter of the seed harvesting brush was 36", while the diameter of the auger brush was 12". The combines were run through a very thinly vegetated stand of Crested Wheat Grass, representing a minimally adequate seed stock source. The headers were maintained approximately 14" above the ground surface. The following variables were maintained as closely as possible over the test run:
1. ground speed: 6 mph
2. seed harvesting brush rotation speed: 210 rpm
3. auger rotation speed: 160 rpm
4. blower/impeller speed: 3000 rpm The following results were obtained:
1. number of acres covered: 80/day/machine
2. time per acre per machine: 9 minutes
3. pounds of seed recovered per acre: 12.5 pounds
4. percentage of seeds recovered as doubles: 20%–25% (est.)
5. amount of plant debris in harvested seeds: 20% (est.)

Observations 1. minimal damage to grasses, leaving forage for grazing animals;
2. minimal damage to shrubs when harvesting grass;
3. virtually all seed harvested from plants;
4. cyclone cleaner not utilized on these machines— plant debris expected to be substantially lower with its use.

The foregoing description should be considered illustrative of the principles of this invention. It should be readily apparent that those skilled in the art can make modifications or changes to various aspects of the invention without departing from the spirit thereof. It is not necessarily desired to limit the invention to the precise configuration shown and described herein but rather the limits of this invention are to be construed solely in light of the appended claims.

I claim:

1. Non-destructive seed harvesting apparatus for harvesting seeds from elongate or bushy plants, said apparatus being removably affixed to a propulsion device and comprising:
   a. an outer housing having a longitudinal axis perpendicular to a direction of travel of said propulsion device;
   b. an adjustable rotatable flexible brush disposed about a shaft aligned long said longitudinal axis within said housing;
   c. at least one auger disposed adjacent said brush and aligned about said longitudinal axis within said housing;
   d. conduit means interconnecting said auger and adjacent seed storage means, and
   e. blower means comprising a plurality of blades adjacent said conduit such that seeds conveyed from said auger to the seed storage means impact upon the blades of said blower means without causing significant damage to the seeds, whereby, when said propulsion device is moved through seed-bearing plants, seeds are harvested from said plants without appreciable damage to the remaining plant.

2. The apparatus as recited in claim 1, wherein the flexible brush is adjustably affixed to the housing such that it may be adjusted either vertically or horizontally within said housing.

3. The apparatus as recited in claim 1, wherein the brush is provided with elongate flexible bristles arranged in spiral configuration about the shaft of said brush to provide relatively uniform point density over the surface of the brush.

4. The apparatus as recited in claim 3, wherein said bristles have a uniform point density of from about 10 points/square inch to about 12 points/square inch.

5. The apparatus as recited in claim 1, wherein the brush is rotated at a speed of about 210 rpm when said propulsion device is moving at a ground speed of at about 6 miles per hour.

6. The apparatus as recited in claim 1, wherein the auger comprises a brush having elongate bristles coiled in spiral arrangement about an auger shaft.

7. The apparatus as recited in claim 6, wherein the auger is operated at a speed of about 160 rpm.

8. The apparatus as recited in claim 1, wherein the blower means comprises a multiple-bladed fan, said blades rotating about an axis aligned parallel with the direction of travel of said seeds within said conduit.

9. The apparatus as recited in claim 1, wherein the housing is provided with an arcuate lower wall portion, such that the brush can be adjusted to sweep with greater or lesser impact force against said lower wall portion.

10. The apparatus as recited in claim 1, wherein the housing is provided with a removable screen member between said auger and said conduit means, said screen member being sized to the particular seed being harvested such that seeds may pass therethrough but a substantial portion of non-seed material is retained thereon.

11. The apparatus as recited in claim 10, wherein the auger is positioned to continuously sweep across the screen member and remove non-seed material retained thereon.

12. The apparatus as recited in claim 11, wherein the auger extends outside the housing such that non-seed material which is separated from the seeds can be removed from said housing.

13. Seed harvesting apparatus adapted for carriage by a conventional self propelled windrower, said apparatus comprising a housing, a rotating seed-gathering brush and conduit means to convey seeds gathered by said brush to seed storage means, the improvement comprising
   a. auger means disposed parallel to said brush,
   b. an adjustable screen member between said conduit means and said auger means adapted to permit passage therethrough of seeds but to retain non-seed debris thereon,
   c. said auger means being arranged such that it sweeps over said screen member to remove non-seed debris therefrom and deposit it outside said housing,
   d. blower means comprising a plurality of fan-like blades positioned within said conduit means and adapted to physically contact substantially all of the seeds conveyed to said seed storage means.

14. The apparatus as recited in claim 13, wherein the flexible brush is adjustably affixed to the housing such that it may be adjusted either vertically or horizontally within said housing.

15. The apparatus as recited in claim 13, wherein the brush and the auger are provided with elongate flexible bristles arranged in spiral configuration about a shaft.

16. The apparatus as recited in claim 13, wherein the conduit means is provided with cyclone separating means to further separate non-seed debris from said seeds.

17. The apparatus as recited in claim 13, wherein the housing is provided with an arcuate lower wall portion, such that the brush can be adjusted to sweep with greater or lesser impact force against said lower wall portion.

18. Non-destructive seed harvesting apparatus for harvesting seeds from elongate or bushy plants, said apparatus being removably affixed to a propulsion device and comprising;
   a. an outer housing having a longitudinal axis perpendicular to a direction of travel of said propulsion device;
   b. an adjustable rotatable flexible brush disposed about a shaft aligned along said longitudinal axis within said housing;
   c. at least one auger disposed adjacent said brush and aligned about said longitudinal axis within said housing;
   d. conduit means interconnecting said auger and adjacent seed storage means;
   e. blower means comprising a plurality of blades adjacent said conduit such that seeds conveyed from said auger to the seed storage means impact upon the blades of said blower means without causing significant damage to the seeds; and
   f. a removable screen member disposed between the auger and the conduit means, said screen member being sized to the particular seed being harvested such that seeds may pass therethrough but a substantial portion of non-seed material is retained thereon.

19. The apparatus as recited in claim 18, wherein the auger is positioned to continuously sweep across the screen member and remove non-seed material retained thereon.

20. The apparatus as recited in claim 19, wherein the auger extends outside the housing such that non-seed material which is separated from the seeds can be removed from said housing.

* * * * *